May 1, 1951　　　　C. H. CARLISLE　　　　2,551,417
APPARATUS FOR SEISMIC EXPLORATION
Filed June 27, 1946
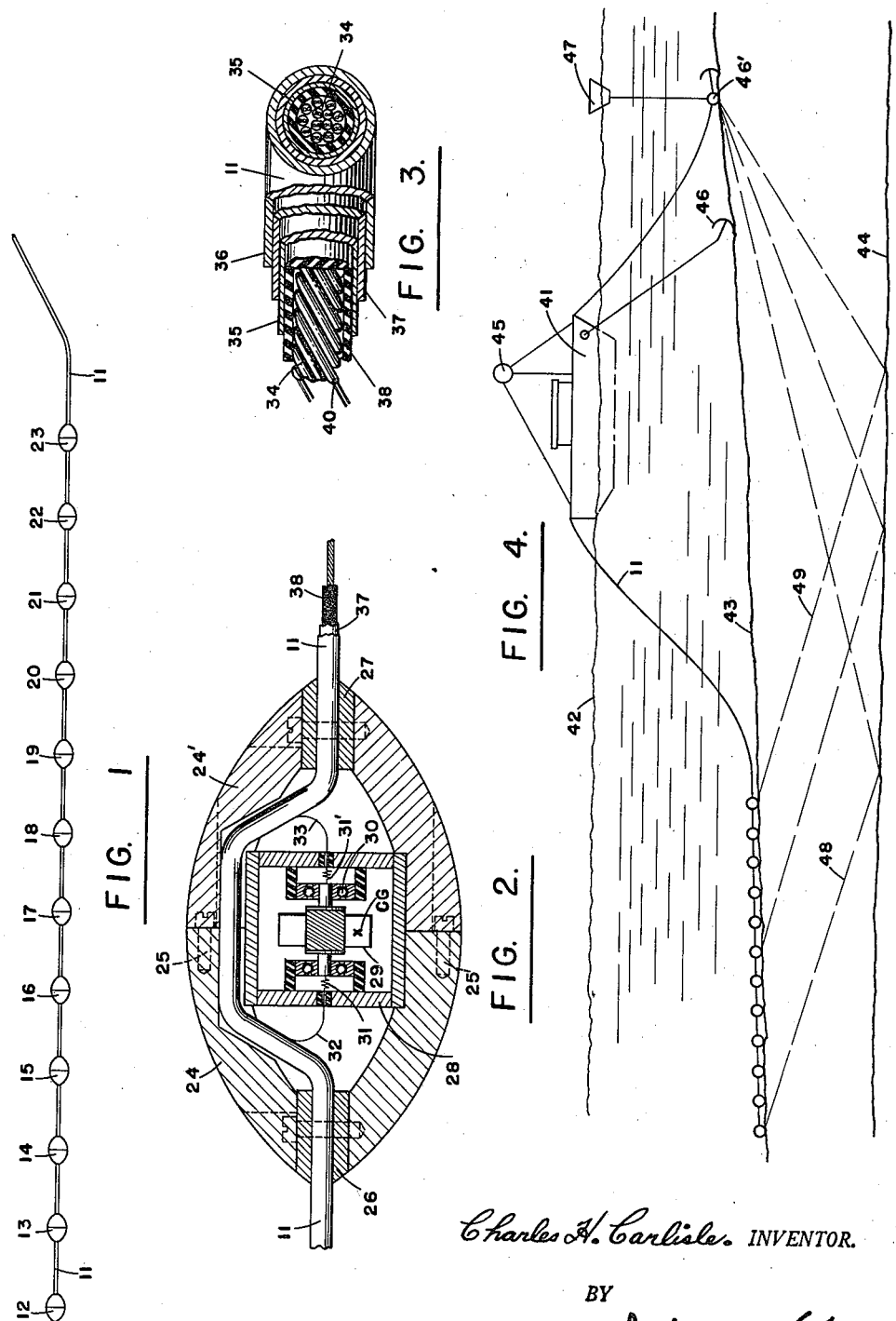
Charles H. Carlisle. INVENTOR.
BY
J. D. McKean
ATTORNEY.

Patented May 1, 1951

2,551,417

UNITED STATES PATENT OFFICE 2,551,417

APPARATUS FOR SEISMIC EXPLORATION

Charles H. Carlisle, Houston, Tex., assignor, by mesne assignments, to Standard Oil Development Company, Elizabeth, N. J., a corporation of Delaware Application June 27, 1946, Serial No. 679,837

4 Claims. (Cl. 177—352)

The present invention is directed to apparatus suitable for seismic exploration and particularly for seismic exploration in bodies of water.

It has been heretofore proposed to conduct underwater seismic exploration by employing watercraft with amplifiers and receivers mounted in the watercraft and with seismic detectors or pickups attached to the craft by conductors so that they may be allowed to rest on the bottom of the body of water whereby records of the seismic disturbance at the point of location of each of these detectors may be obtained. In the apparatus that has been proposed for such an operation, there has been no assurance that the detectors are accurately spaced along the bottom of the water body when obtaining the seismic records or that they are in a straight line.

For seismic exploration, it is important, if accurate results are to be obtained, to see to it that the detectors be located along a known horizontal straight line and that they be in contact with the ground. Detectors merely located in the water do not solve the problem. They do not detect the low frequency ground motion with the extreme accuracy required for seismic exploration work.

It is an object of the present invention to devise an apparatus suitable for use in water seismic exploration which will give extremely accurate results. The apparatus may be described briefly as comprising a cable carrying a plurality of insulated conductors and so constructed as to provide sufficient rigidity that it will normally lie on an approximately straight line together with a plurality of spaced detectors or seismic pickups mounted at spaced points thereon.

Each detector or seismic pickup contains a geophone connected to a pair of the insulated conductors of the cable. The cable may be readily dragged along the bed of a body of water and the output of the geophones transmitted along the cable.

The present invention will now be described in greater detail in conjunction with the drawing in which—

Fig. 1 is an elevation of one embodiment of the present invention;

Fig. 2 is a view, partly in section, of a detector mounted on the cable;

Fig. 3 is a view, partly in section, of the multi-conductor cable showing details of construction thereof; and Fig. 4 is a view illustrating the arrangement of the device of the present invention when making a seismic survey.

Referring now specifically to the drawing, a cable 11 has a plurality of seismic detectors mounted thereon. In Fig. 1 the seismic detectors are identified by numerals 12 to 23, inclusive. It will be noted that they are spaced equidistantly from each other along a portion of the cable. The end of the cable upon which no detectors are mounted is that end which in usual operations is attached to the surface vessel employed to carry the receiving equipment.

Referring to Fig. 2, it will be seen that each of the detectors or drag seismometers shown consists of sections 24 and 24' which are fastened together by screws 25 to form a complete housing or elongated casing which is adapted for drag movement in the direction of its longitudinal axis along an earthen surface. Each section defines an aperture which allows cable 11 to be run through the assembled housing. The housing is secured in fixed position with respect to the cable by a clamp 26 carried by section 24 and a clamp 27 carried by section 24'.

Mounted within each housing is a waterproof case 28 in which is mounted a geophone 29. The geophone is mounted on gimbals 30 carried by case 28. The center of gravity of the geophone is below its center of suspension with the center of the gravity designated by the letters CG in the drawing whereby the geophone is gravitationally biased for rotation about an axis coinciding with the axis of the housing. Stated in other words, gimbals 30 provide cradle means rotatably holding the geophone or seismometer 29 within the casing for free movement on an axis substantially parallel to the longitudinal axis of the casing. This arrangement insures that the geophone will always occupy the same substantially vertical position relative to the longitudinal axis of the casing or housing no matter how the housing is rotated angularly about its longitudinal axis. The space between the geophone and the housing may be filled with a suitable damping fluid, such as mineral oil. The output of the geophone is connected through spring contactors 31 and 31' and conductors 32 and 33 to one of the pairs of conductors 34 of cable 11 whereby the output of the geophone may be transmitted to a suitable receiving instrument electrically connected to the upper end of the cable in the vessel 41.

It will be noted that the construction of the detector housing and geophone insures that the axis of suspension of the geophone will coincide with the axis of the cable outside the detector. With this construction, as long as the assembly lies in a straight line the several detectors mounted on the cable may be spaced in a predetermined manner. It will be noted that the portion of the cable within the detector housing does not coincide on the axis of the cable outside the housing, but rather it is bent around the waterproof case 28.

In Fig. 3 it will be seen that the cable is provided with a steel sheath 35 and with a double layer of armor 36 and 37. Inside the sheath 35 there is a layer of insulating material 38, for example, rubber, which surrounds a plurality of pairs of conductors 34 which are insulated from each other by a thin layer of insulation 40. The cable contains 12 pairs of conducting wires whereby each of the geophone units, as shown in Fig. 1, may be electrically connected to a separate pair of conductors in the cable.

In order to explain further the advantages of the present invention, a typical seismic operation utilizing the apparatus of the present invention will now be described in conjunction with Fig. 4.

A surface vessel 41 has mounted thereon suitable amplifying and recording equipment, not shown, for receiving the signals from the seismic detectors. The surface of the water is indicated by a numeral 42 and the bed of the body of water by 43. A reflecting horizon in the strata is indicated by 44.

In making a survey, the surface vessel proceeds along a fixed course while dragging the cable having the seismic detector units spaced thereon. The seismic detectors rest on the bed of the body of water at whatever depth the bottom may be along the course of the survey. The vessel proceeds on its course with the course and distance determined by radar triangulation surveys. In the drawing the radar disc is mounted above the vessel and is designated by numeral 45. When the vessel has proceeded a fixed distance, it is brought to rest and retains its position by anchor 46. Charges of explosives are then planted at points determined by the radar survey; In Fig. 4 the charge of explosives is indicated by numeral 46' with its position marked by buoy 47. It will be understood that since the vessel has proceeded on a fixed course the seismic detectors lie in a plane; in addition, it will be usually found that the irregularities at the bottom of the water are such that the geophones are at substantially equal depth. With the detectors in position on the bottom, the charge of explosives may be detonated and the seismic records obtained. In the drawing, the paths of the seismic waves through the subsurface formations are indicated by dotted lines 48 and 49. After the shots have been fired the anchor is hoisted and the ship proceeds on its course with the cable dragging along the bottom of the bed of water until the ship reaches the next location where the ship is anchored, the charges of explosives planted and the operation repeated. In this manner, the seismic survey is completed while the ship continues along a fixed and determined course.

While a specific embodiment of the present invention has been described, it will be evident to a workman skilled in the art that various changes may be made without departing from the spirit of the invention and it is my intention to embrace such changes in the hereto appended claims.

I claim:

1. Apparatus adapted for seismic exploration comprising, in combination, a cable carrying a plurality of insulated conductors and of sufficient rigidity that it will normally lie in a straight line, a plurality of detectors mounted at spaced points along the cable, each detector consisting of an elongated housing having its axis coincident with the axis of cable outside the housing and a geophone mounted therein and arranged for rotation about an axis coinciding with the axis of the housing, and conductors electrically connecting each geophone with a separate pair of insulated conductors of said cable.

2. Apparatus adapted for seismic exploration comprising, in combination, a cable carrying a plurality of insulated conductors and of sufficient rigidity that it will normally lie in a straight line, a plurality of detectors mounted at spaced points thereon, each detector consisting of a symmetrical elongated housing having its axis coincident with the axis of the portion of the cable outside the housing and a geophone mounted in each housing and arranged for rotation about an axis coinciding with the axis of the housing, each geophone being so mounted that its center of gravity is spaced from its axis of rotation, and conductors electrically connecting each geophone with a separate pair of insulated conductors of said cable.

3. Apparatus adapted for seismic exploration comprising, in combination, a cable carrying a plurality of insulated conductors and of sufficient rigidity that it will normally lie in a straight line, a plurality of detectors mounted at spaced points along the cable, each detector consisting of an elongated housing having its axis coincident with the axis of the cable outside the housing and a geophone mounted therein and gravitationally biased for rotation about an axis coinciding with the axis of the housing, and conductors electrically connecting each geophone with a separate pair of insulated conductors of said cable.

4. A drag seismometer means comprising an elongated casing adaptable for drag movement in the direction of its longitudinal axis along an earthen surface, a seismometer, and cradle means rotatably mounting the seismometer within the casing for free movement on an axis substantially parallel to the longitudinal axis of the casing and in a manner such that the seismometer will be maintained in a fixed, substantially vertical position relative to the longitudinal axis of the casing irrespective of the number of rotations of the casing about its longitudinal axis in either direction.

CHARLES H. CARLISLE.

REFERENCES CITED

The following references are of record in the file of this patent:

UNITED STATES PATENTS

| Number | Name | Date |
| --- | --- | --- |
| 1,470,733 | Hayes | Oct. 16, 1923 |
| 2,019,497 | Kuntze | Nov. 5, 1935 |
| 2,021,330 | Ross et al. | Nov. 19, 1935 |
| 2,191,120 | Slichter | Feb. 20, 1940 |
| 2,191,121 | Slichter | Feb. 20, 1940 |
| 2,241,428 | Silverman | May 13, 1941 |
| 2,283,200 | Flude | May 19, 1942 |
| 2,324,378 | Flude | July 13, 1943 |
| 2,407,697 | Williams | Sept. 17, 1946 |
| 2,410,805 | Black | Nov. 12, 1946 |
| 2,440,903 | Massa | May 4, 1948 |